(12) United States Patent
Anand et al.

(10) Patent No.: US 9,684,586 B2
(45) Date of Patent: Jun. 20, 2017

(54) SYSTEM TEST COMPLIANCE TOOL

(71) Applicant: Bank of America Corporation, Charlotte, NC (US)

(72) Inventors: Mandeep Singh Anand, New Delhi (IN); Sushil Kumar, Punjab (IN); Hitendra Kumar, Uttar Pradesh (IN)

(73) Assignee: Bank of America Corporation, Charlotte, NC (US)

(*) Notice: Subject to any disclaimer, the term of this patent is extended or adjusted under 35 U.S.C. 154(b) by 0 days.

(21) Appl. No.: 14/884,180

(22) Filed: Oct. 15, 2015

(65) Prior Publication Data

US 2017/0109263 A1    Apr. 20, 2017

(51) Int. Cl.
*G06F 9/44*    (2006.01)
*G06F 11/36*    (2006.01)

(52) U.S. Cl.
CPC ...... *G06F 11/3676* (2013.01); *G06F 11/3688* (2013.01)

(58) Field of Classification Search
CPC .................... G06F 11/3676; G06F 11/3688
USPC .................................................. 717/124–135
See application file for complete search history.

(56) References Cited

U.S. PATENT DOCUMENTS

| | | | | |
|---|---|---|---|---|
| 6,725,399 | B1* | 4/2004 | Bowman | G06F 11/3664 714/38.14 |
| 9,256,520 | B2* | 2/2016 | Agarwal | G06F 11/3684 714/37 |
| 9,396,094 | B2* | 7/2016 | Browne | G06F 11/3676 717/125 |

\* cited by examiner

*Primary Examiner* — Ted T Vo
(74) *Attorney, Agent, or Firm* — Michael A. Springs

(57) ABSTRACT

An apparatus includes a memory and a processor. The memory stores a test plan, a plurality of performed steps, a configuration for a test environment in which the test was performed, and a result of the test. The processor compares the plurality of performed steps to the plurality of planned steps, compares the configuration for a first test environment and the configuration for the second test environment, and determines whether an action of the plurality of actions resulted in a failure. The processor presents a first chart, a second chart, and a third chart the results of the comparisons and determination. The processor deploys an application corresponding to the test plan if each step of the plurality of planned steps was performed during the test, if the second test environment was configured according to the configuration for the first test environment, and if the failure was fixed.

21 Claims, 3 Drawing Sheets

SYSTEM TEST COMPLIANCE TOOL

TECHNICAL FIELD

This disclosure relates generally to a system for managing and improving system test compliance.

BACKGROUND

A computing system includes several computing devices that each execute software applications. When executed, each software application may present a risk to the computing devices and/or the computing system. For example, a software application may be programmed improperly and crash a computing device. As another example, a software application may be programmed improperly and could create an intrusion point for malware and/or hackers when executed on a computing device.

SUMMARY OF THE DISCLOSURE

According to one embodiment, an apparatus includes a memory and a processor. The memory is configured to store a test plan comprising a plurality of planned steps to be performed during a test and a configuration for a first test environment. The memory is further configured to store a plurality of performed steps, a configuration for a second test environment in which the test was performed, and a result of the test. The processor is configured to compare the plurality of performed steps to the plurality of planned steps to determine whether each step of the plurality of planned steps was performed during the test and to compare the configuration for the first test environment and the configuration for the second test environment to determine whether the second test environment was configured according to the configuration for the first test environment. The processor is further configured to determine, based on the result of the test, that an action of the plurality of actions resulted in a failure and to present, on a display, a first chart that indicates each step of the plurality of planned steps and whether each step of the plurality of planned steps was performed during the test. The processor is further configured to present, on the display, a second chart that indicates whether the second test environment was configured according to the configuration for the first test environment, present, on the display, a third chart that indicates the failure, and deploy an application corresponding to the test plan if each step of the plurality of planned steps was performed during the test, if the second test environment was configured according to the configuration for the first test environment, and if the failure was fixed.

According to another embodiment, a method includes storing a test plan comprising a plurality of planned steps to be performed during a test and a configuration for a first test environment. The methods also includes storing a plurality of performed steps, storing a configuration for a second test environment in which the test was performed, and storing a result of the test. The method further includes comparing the plurality of performed steps to the plurality of planned steps to determine whether each step of the plurality of planned steps was performed during the test and comparing the configuration for the first test environment and the configuration for the second test environment to determine whether the second test environment was configured according to the configuration for the first test environment. The method also includes determining, based on the result of the test, that an action of the plurality of actions resulted in a failure and presenting, on a display, a first chart that indicates each step of the plurality of planned steps and whether each step of the plurality of planned steps was performed during the test. The method further includes presenting, on the display, a second chart that indicates whether the second test environment was configured according to the configuration for the first test environment, presenting, on the display, a third chart that indicates the failure, and deploying an application corresponding to the test plan if each step of the plurality of planned steps was performed during the test, if the second test environment was configured according to the configuration for the first test environment, and if the failure was fixed.

According to another embodiment, a system includes a first compliance device and a second compliance device. The first compliance device is configured to store a test plan comprising a plurality of planned steps to be performed during a test and a configuration for a first test environment. The first compliance device is further configured to store a plurality of performed steps, to store a configuration for a second test environment in which the test was performed, and to store a result of the test. The second compliance device is configured to compare the plurality of performed steps to the plurality of planned steps to determine whether each step of the plurality of planned steps was performed during the test and to compare the configuration for the first test environment and the configuration for the second test environment to determine whether the second test environment was configured according to the configuration for the first test environment. The second compliance device is further configured to determine, based on the result of the test, that an action of the plurality of actions resulted in a failure and to present, on a display, a first chart that indicates each step of the plurality of planned steps and whether each step of the plurality of planned steps was performed during the test. The second compliance device is also configured to present, on the display, a second chart that indicates whether the second test environment was configured according to the configuration for the first test environment, present, on the display, a third chart that indicates the failure, and deploy an application corresponding to the test plan if each step of the plurality of planned steps was performed during the test, if the second test environment was configured according to the configuration for the first test environment, and if the failure was fixed.

Certain embodiments may provide one or more technical advantages. For example, an embodiment may improve the functioning of computing devices by ensuring that applications executed by the computing devices have been tested in the appropriate environments. As another example, an embodiment may improve the security of computing devices by ensuring that applications executed by the computing device have passed security testing. As yet another example, an embodiment may improve the security of the computing system and/or computing network by ensuring that applications executed on the system have passed security testing. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
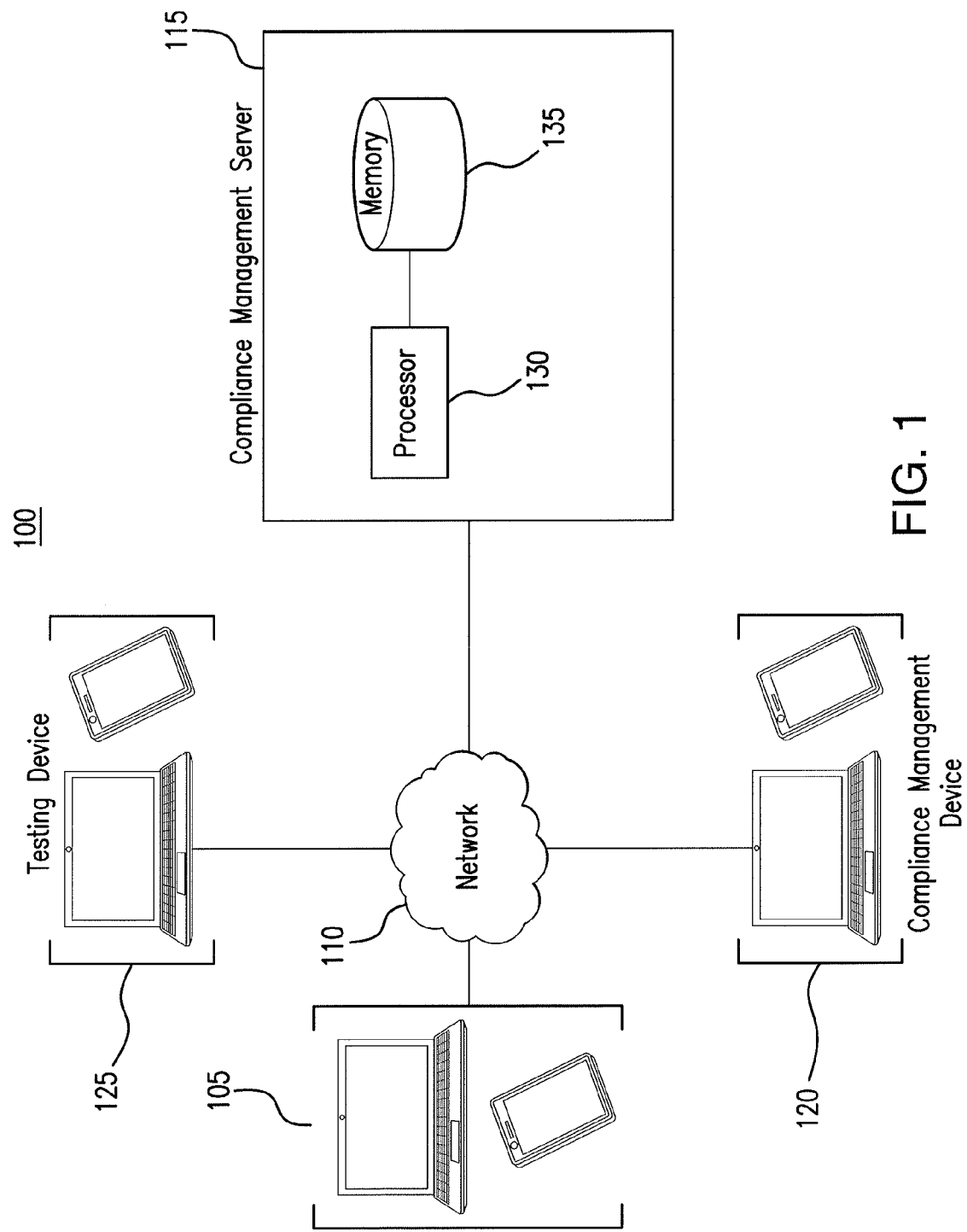
FIG. 1 illustrates a system for performing system test compliance.
Figure 2:
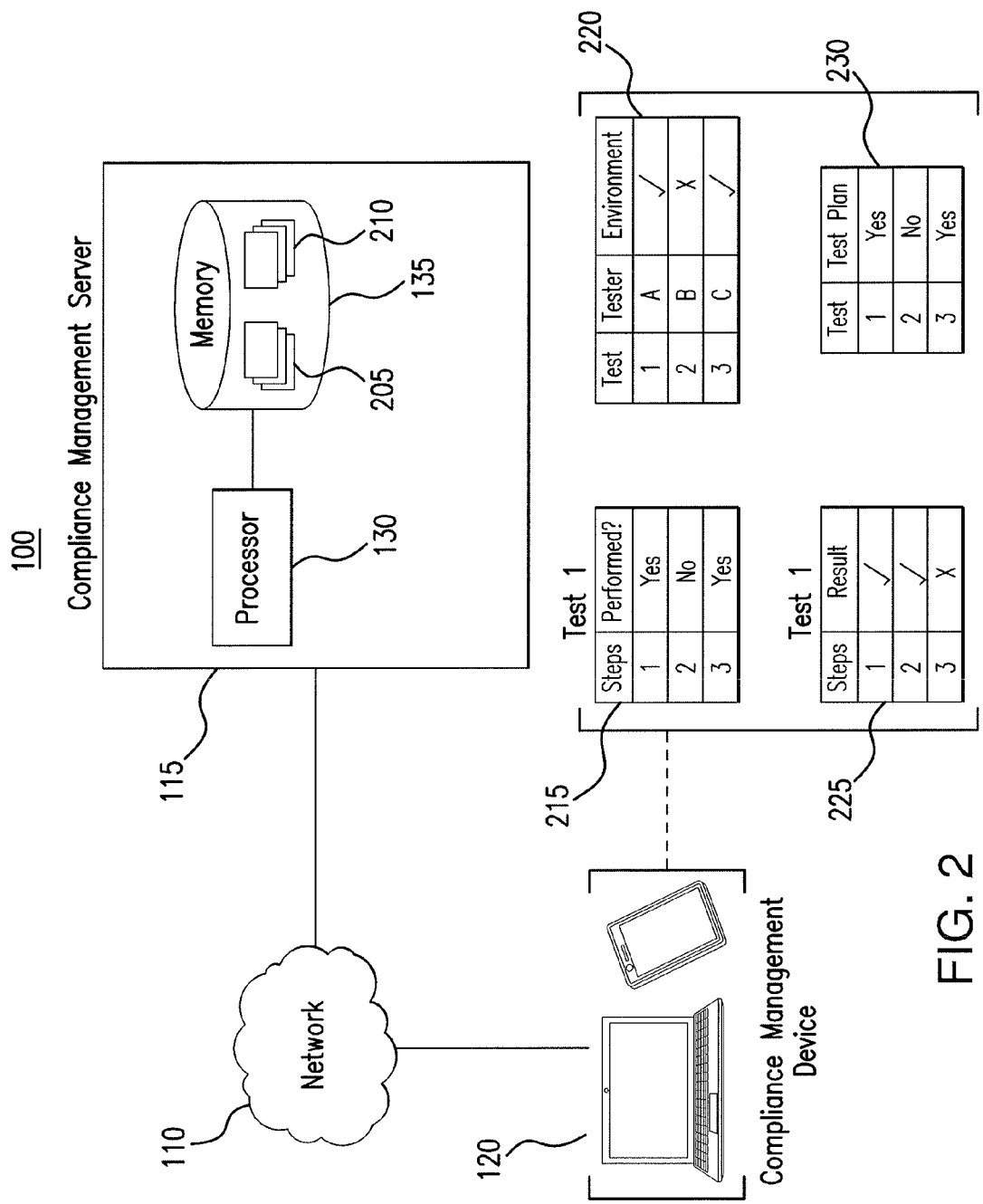
FIG. 2 illustrates the system of FIG. 1 performing system test compliance.
Figure 3:
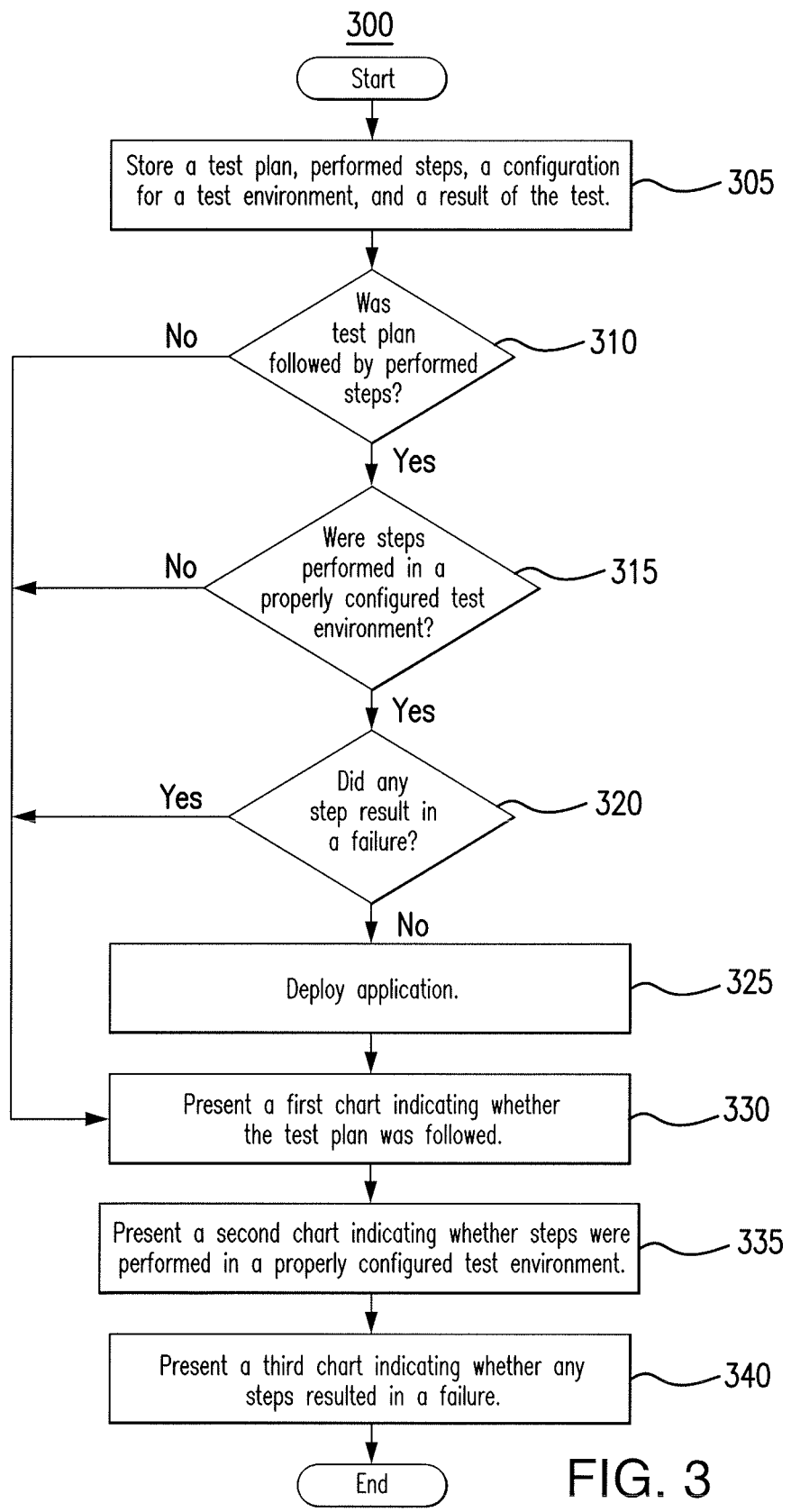
FIG. 3 is a flowchart illustrating a method for performing system test compliance using the system of FIG. 1.

Embodiments of the present disclosure and its advantages are best understood by referring to FIGS. 1 through 3 of the drawings, like numerals being used for like and corresponding parts of the various drawings.

The security of a computing system is important to the functioning of the system. If a computing system is not secure, then any number of types of intrusions and/or malware may jeopardize the core functionality of the system or any user device in the system. Therefore, maintaining the security of the system is a problem inherent to computing systems, such as the Internet, and is important to the functioning of the system itself.

When a new software application is deployed in the system, that application may introduce a risk to the security of the computing system. For example, the new application may create an entry point for intrusions and/or malware that could affect other devices in the system. As another example, the application may cause certain portions of the computing system to crash. Therefore, the security and functioning of a computing system is placed at risk when a new software application is deployed.

One way to reduce the security risk posed by new software applications is to test the application in a controlled environment prior to deploying the software application. For example, the application may be tested to determine whether the application will crash any components of the computing system. As another example, the application may be tested to determine whether it creates any entry points for intrusions and/or malware. However, as computing systems grow bigger and as applications become more complex, the risk that the application is not tested appropriately before deployment increases. For example, not all features of the application may be tested. As another example, the test environment may not be appropriately configured. As yet another example, certain portions of the application may be tested incompletely. As a result, the application may present a risk to the security of the computing system when deployed.

This disclosure contemplates a system that manages and improves system test compliance. The system may perform certain checks to determine whether a software application is properly tested before deploying the software application into the computing system. The system may store a test plan and a series of steps performed during a test. The system may also store a configuration of the test environment used to perform the test. The system may further store results of the performed test. The system may then perform various comparisons to determine whether the test was performed appropriately. For example, the system my compare the series of steps performed during the test against the stored test plan to determine whether each step of the test plan was performed during the test. As another example, the system may compare the configuration for the test environment against the test plan to determine whether the test environment was configured properly. As yet another example, the system may review the results of the test to determine whether any steps resulted in a failure.

If all the steps of the test plan were performed, the test environment was configured properly, and none of the test steps resulted in a failure, the system may deploy the application. Otherwise, the system may prevent the deployment of the application and present information describing why the application was not deployed. For example, the system may present a first chart that indicates which steps of the test plan were performed or were not performed. As another example, the system may present a chart indicating whether the test environment was configured properly or not. As yet another example, the system may present a chart indicating whether each step of the test and/or test plan resulted in a failure. As yet another example, the system may present a chart indicating whether the test even had a corresponding test plan. In this manner, the system may reduce the chances that a software application will present a security risk to the computing system.

In certain embodiments, the system improves the security of the computing system by ensuring that software applications are properly tested before deploying the software applications across the computing system. In some embodiments, the system improves the functioning of the computing system by ensuring that a software application will not crash a component of the computing system. The system will be described in more detail using FIGS. 1 through 3. FIG. 1 presents a general overview of the system. FIG. 2 describes the operation of the system. FIG. 3 is a flowchart illustrating the operation of the system.

FIG. 1 illustrates a system 100 for performing system test compliance. As illustrated in FIG. 1, system 100 includes a device 105, a network 110, a compliance management server 115, a compliance management device 120, and a testing device 125. In general, testing of a software application may be reviewed by compliance management server 115 and compliance management device 120 before the application is deployed to device 105. In this manner, the security and functioning of system 100 is improved in certain embodiments.

Device 105 may execute software applications. During execution the application may have device 105 communicate with other devices 105 in system 100. If the application presents a risk to the security of device 105, then executing that application may present a risk to the rest of system 100. For example, the application may create an entry point for hackers and/or malware. As another example, the application may cause device 105 or another component of system 100 to crash. One way to reduce the threat posed by the application is to test the application before deploying it to device 105. However, if system 100 is large and/or if the application is complex then the test may be inappropriately configured for device 105 and/or system 100.

This disclosure contemplates device 105 being any appropriate device that can communicate over network 110. For example, device 105 may be a computer, a laptop, a wireless or cellular telephone, an electronic notebook, a personal digital assistant, a tablet, a server, a mainframe, or any other device capable of receiving, processing, storing, and/or communicating information with other components of system 100. Device 105 may also include a user interface, such as a display, a microphone, keypad, or other appropriate terminal equipment usable by a user. In some embodiments, an application executed by device 105 may perform the functions described herein.

Network 110 may facilitate communication between and amongst the various components of system 100. This disclosure contemplates network 110 being any suitable network operable to facilitate communication between the components of system 100. Network 110 may include any interconnecting system capable of transmitting audio, video, signals, data, messages, or any combination of the preceding. Network 110 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Compliance management server 115 may be used to manage and/or oversee test compliance. As illustrated in FIG. 1, compliance management server 115 may include a processor 130 and a memory 135. Processor 130 may be communicatively coupled to memory 135. This disclosure contemplates processor 130 and memory 135 being configured to perform any function of compliance management server 115 described herein.

Processor 130 may execute software stored on memory 135 to perform any of the functions described herein. Processor 130 may control the operation and administration of compliance management server 115 by processing information received from network 110, device 105, and memory 135. Processor 130 may include any hardware and/or software that operates to control and process information. Processor 130 may be a programmable logic device, a microcontroller, a microprocessor, any suitable processing device, or any suitable combination of the preceding.

Memory 135 may store, either permanently or temporarily, data, operational software, or other information for processor 130. Memory 135 may include any one or a combination of volatile or non-volatile local or remote devices suitable for storing information. For example, memory 135 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 135, a disk, a CD, or a flash drive. In particular embodiments, the software may include an application executable by processor 130 to perform one or more of the functions described herein.

Generally, compliance management server 115 may determine whether an application has been appropriately tested before deploying the application to device 105. Compliance management server 115 may store test plans. Each test plan may indicate what steps an appropriate test should include. For example, each test plan may include a plurality of steps that should be performed by a test to appropriately test the application. Each test plan may also include a configuration for a testing environment that is appropriate for running the test. In some embodiments, each test plan includes the expected results of each step of the test plan. For example, the test plan may indicate that performing a certain step should not crash another device 105 of system 100. If performing that step during the test causes a crash, then that step will result in a failure.

Compliance management server 115 may store information associated with performed tests. For example, compliance management server 115 may store steps that were performed during a test. As another example, compliance management server 115 may store a configuration for a test environment in which the test was performed. As yet another example, compliance management server 115 may store results of the test. For example, compliance management server 115 may store a result for each performed step of the test.

Compliance management server 115 may compare the information associated with a performed test with a test plan to determine if the test was performed appropriately. For example, compliance management server 115 may compare the steps that were performed during the test with the steps indicated by the test plan to determine whether every step of the test plan was performed during the test. As another example, compliance management server 115 may compare the configuration of the test environment in which the test was performed with the configuration indicated by the test plan to determine whether the test was performed in an appropriately configured test environment. As yet another example, compliance management server 115 may compare the results of the test with the results indicated in the test plan to determine if any of the steps of the test resulted in failure.

In certain embodiments, if compliance management server 115 determines that the test was performed appropriately, compliance management server 115 deploys the tested software application to device 105. By deploying the application after compliance management server 115 determines that the application has been appropriately tested, the security and/or functioning of system 100 may be maintained and/or improved. For example, testing may ensure that the application will not create an entry point for intrusions and/or malware. As another example, testing may ensure that the application will not crash certain components of system 100.

Compliance management device 120 may be used to access information stored in compliance management server 115. Compliance management server 115 may communicate requested information to compliance management device 120. For example, compliance management device 120 may request information regarding stored test plans and/or information associated with performed tests. In response, compliance management server 115 may communicate the requested information to compliance management device 120. Compliance management device 120 may then present that information to an administrator of system 100.

This disclosure contemplates compliance management device 120 being any appropriate device that can communicate over network 110. For example, compliance management device 120 may be a computer, a laptop, a wireless or cellular telephone, an electronic notebook, a personal digital assistant, a tablet, a server, a mainframe, or any other device capable of receiving, processing, storing, and/or communicating information with other components of system 100. Compliance management device 120 may also include a user interface, such as a display, a microphone, keypad, or other appropriate terminal equipment usable by a user. In some embodiments, an application executed by compliance management device 120 may perform the functions described herein. For example, compliance management device 120 may present various charts providing information about test plans and/or performed tests to the administrator.

Testing device 125 may be used to perform tests of software applications. Testing device 125 may be configured by a tester before performing the test of the software application. After testing device 125 has completed the test, testing device 125 may communicate information about the test and the testing environment to compliance management server 115. Compliance management server 115 may then store that information for later use. This disclosure contemplates testing device 125 being any appropriate device that can communicate over network 110. For example, testing device 125 may be a computer, a laptop, a wireless or cellular telephone, an electronic notebook, a personal digital assistant, a tablet, a server, a mainframe, or any other device capable of receiving, processing, storing, and/or communicating information with other components of system 100. Testing device 125 may also include a user interface, such as a display, a microphone, keypad, or other appropriate terminal equipment usable by a user. In some embodiments, an application executed by testing device 125 may perform the functions described herein.

In certain embodiments, by using system 100 the security and function of system 100 is maintained and/or improved. For example, the security of system 100 may be improved by using system 100 to determine whether a software application has passed an appropriately run security test. As another example, the function of system 100 may be improved by ensuring that a software application will not crash certain components of system 100 by determining whether the software application has been appropriately tested.

Modifications, additions, or omissions may be made to system 100 without departing from the scope of the invention. For example, compliance management server 115 may be a distributed server. As another example, the components of system 100 may be integrated or separated. For example, testing device 125 may be incorporated into device 105. Furthermore, system 100 may include any number of devices 105.

FIG. 2 illustrates the system 100 of FIG. 1 performing system test compliance. For purposes of clarity, certain elements of system 100 have not been illustrated in FIG. 2. However, their omission from FIG. 2 should not be construed as their removal from system 100. In certain embodiments, by performing system test compliance, system 100 may improve the security and function of system 100. For example, system test compliance may ensure that deployed applications do not create entry points for intrusions and/or malware. As another example, system test compliance may ensure that deployed applications do not crash particular components of system 100.

Compliance management server 115 may store test plans 205. Each test plan 205 may indicate a procedure for performing a test appropriately. For example, each test plan 205 may indicate a plurality of planned steps to be performed during a test and a proper configuration for a test environment in which to perform the test. Each test plan 205 may also indicate an expected result of each planned step. If a test is performed according to test plan 205, then the test may perform each step of the plurality of planned steps in a test environment configured according to the configuration indicated by test plan 205, and each step of the test may produce the expected result indicated by test plan 205.

In certain embodiments, the configuration indicated by test plan 205 for the test environment in which a test is to be performed specifies at least one of an operating system, a patch level, and a hardware specification. The operating system may be the operating system installed in the test environment. The patch level may be the patch level of the operating system installed in the test environment. The hardware specification may be the hardware included in the testing environment that executes the test such as, for example, the hardware for testing device 125.

Compliance management server 115 may store information 210 associated with tests performed using system 100. Information 210 may include a plurality of performed steps for each performed test. Information 210 may also include configurations for each test environment in which the tests were performed. Information 210 may also include results for each performed test. Compliance management server 115 may compare information 210 with test plans 205 to determine whether certain tests were performed appropriately.

Compliance management server 115 may compare test plans 205 with information 210 to determine whether each performed test corresponds to a test plan 205. When a performed test does not have a corresponding test plan 205, it may not be possible to determine whether that test was performed appropriately. Therefore, it is important for each performed test to have a corresponding test plan. Compliance management server 115 may store whether each performed test has a corresponding test plan.

Compliance management server 115 may compare test plans 205 with information 210 to determine whether each planned step of a test plan 205 was performed during a test. If a planned step was not performed during a test, then the test may not have been appropriately performed. For example, if a step was not performed then a security flaw in a tested application may not be discovered. As another example, if not all planned steps were performed then a fatal execution branch of a tested application may go unnoticed. It is important then that each planned step of a test plan 205 be performed during a test.

Compliance management server 115 may compare test plans 205 with information 210 to determine whether the test environments in which tests were performed were configured properly. For example, compliance management server 115 may determine whether a test environment in which a test was performed had the appropriate operating system and patch level installed in the test environment, compliance management server 115 may also determine whether the testing environment included the appropriate hardware on which to perform the test. If the testing environment was not configured appropriately, then the test results may be unreliable. For example, if the test environment had an outdated operating system and/or patch level installed in the test environment, then certain steps of the test may result in failures and/or certain steps may not be performed at all. As another example, if the test environment included outdated hardware then the test may fail to complete.

Compliance management server 115 may compare test plans 205 and information 210 to determine which steps of a performed test resulted in failures. For example, compliance management server 115 may compare the results of the performed test with the expected results included in test plan 205 to determine whether the steps resulted in failure. When a test step results in failure, it may indicate a flaw with the software application being tested. Deployment of the application may be delayed until the failure has been repaired. In certain embodiments, compliance management server 115 and/or compliance management device 120 determines whether and when the failure has been repaired.

Compliance management server 115 may communicate information to compliance management device 120 to inform an administrator on whether certain performed tests were in compliance. The information may be presented on a display of compliance management device 120. In this manner, compliance management server 115 may present information on a display of compliance management device 120. As illustrated in FIG. 2, the information presented on the display may take the form of charts. For example, chart 215 indicates whether each planned step of a test plan 205 was performed. As illustrated in FIG. 2, chart 215 indicates that planned steps 1 and 3 of Test 1 were performed but planned step 2 of Test 1 was not performed.

Chart 220 indicates whether the test environment for particular tests were configured appropriately. As illustrated in FIG. 2, the test environments for Tests 1 and 3 were configured appropriately but the environment for Test 2 was not configured appropriately. Chart 220 may also indicate the identity of the tester who performed the tests. As illustrated in FIG. 2, Test 1 was performed by Tester A, Test two was performed by Tester B, and Test three was performed by Tester C. This disclosure contemplates any of charts 215, 220, 225 and 230 identifying the tester that performed a test. Chart 225 indicates whether a performed step of a test resulted in failure. As illustrated in FIG. 2, steps one and two of Test 1 were successful, but step three of Test one resulted in failure. Chart 230 indicates whether a test has a corresponding test plan 205. As illustrated in FIG. 2, Tests 1 and 3 have corresponding test plans 205, but Test 2 does not have a corresponding test plan 205.

When an administrator reviews the information communicated from compliance management server 115, the administrator may take appropriate action to ensure that a test is performed appropriately. For example, if certain planned steps of a test were not performed or if the test environment in which the test was performed was not configured appropriately, then the administrator may contact the tester who performed the test and instruct him or her to perform the test appropriately. As another example, if certain steps of a test resulted in failure, then the administrator may contact a developer of the application and instruct the developer to fix and/or repair the failure. As yet another example, if a performed test does not have a corresponding test plan 205, then the administrator may contact the tester who performed the test and instruct him to develop the appropriate test plan 205.

In certain embodiments, an administrator may store in compliance management server 115 a step that should be included in a test plan 205 that is not already included in the test plan 205. For example, if a particular test plan 205 includes ten steps, but the administrator believes that an eleventh step should also be included in the test plan 205, then the administrator may store that eleventh step in compliance management server 115. The administrator and/or a tester may determine whether that step should be included in the test plan 205. Compliance management server 115 may present on a display of compliance management device 120 a chart indicating each such step that should be included in a test plan 205 but is not included in a test plan 205. In this manner, test plans 205 may be updated to reflect the steps that should be performed during an appropriately performed test.

Compliance management server 115 may deploy an application if that application has been tested appropriately and has passed each test. For example, if each of the tests performed on the application had a corresponding test plan 205, if each planned step of the test plans 205 was performed successfully and did not result in failure, and if the test environments for the tests were configure appropriately, then compliance management server 115 may deploy the application. In some embodiments, an administrator may review information on compliance management device 120 and instruct compliance management server 115 to deploy the application.

In this manner, system 100 may improve the functioning and security of system 100. For example, system 100 may ensure that an application will not create an entry point for intrusions and/or malware when executed in certain embodiments. As another example, compliance management server 115 may ensure that an application will not crash certain components of system 100 in some embodiments.

FIG. 3 is a flowchart illustrating a method 300 for performing system test compliance using the system 100 of FIG. 1. In certain embodiments, compliance management server 115 performs method 300.

Compliance management server 115 may begin by storing a test plan for a test, a series of steps performed during the test, a configuration for a test environment used to perform the test, and results of the test in step 305. In step 310, compliance management server 115 may determine whether a test plan was followed by the performed steps. In other words, compliance management server 115 may determine whether each planned step indicated by the test plan was performed during the test. If some planned steps were not performed, then compliance management server 115 may not deploy an application because it was improperly tested and continue to step 330. If each planned step of the test plan was performed, then compliance management server 115 may continue to step 315.

In step 315, compliance management server 115 may determine whether the steps were performed in a properly configured test environment. Compliance management server 115 may make this determination by comparing the configuration for the test environment with a configuration indicated by the test plan. If the test was not performed in a properly configured test environment, then compliance management server 115 may not deploy the tested application because it was not tested properly and continue to step 330. If the test was performed in a properly configured test environment, compliance management server 115 may continue to step 320. In step 320, compliance management server 115 may determine whether any steps resulted in a failure. If any steps resulted in a failure, then the tested application did not pass the test. As a result, compliance management server 115 may not deploy the application and may continue to step 330. If no steps resulted in a failure, compliance management server 115 may continue to step 325 to deploy the application.

Compliance management server 115 may then present a first chart indicating whether the test plan was followed in step 330. The chart may indicate whether each planned step of the test plan was performed during the test. In step 335, compliance management server 115 may present a second chart indicating whether the steps were performed in a properly configured test environment. Then in step 340, compliance management server 115 may present a third chart indicating whether any steps resulted in a failure.

In certain embodiments, by performing method 300, compliance management server 115 improves the security of system 100. For example, compliance management server 115 may prevent the deployment of applications that create entry points for hackers and/or malware. In some embodiments, by performing method 300, compliance management server 115 improves the functioning of system 100. For example, compliance management server 115 prevents the deployment of applications that may crash certain components of system 100.

Modifications, additions, or omissions may be made to method 300 depicted in FIG. 3. Method 300 may include more, fewer, or other steps. For example, steps may be performed in parallel or in any suitable order. While discussed as compliance management server 115 performing the steps, any suitable component of system 100, such as compliance management device 120 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims. To aid the Patent Office, and any readers of any patent issued on this application in interpreting the claims appended hereto, applicants note that they do not intend any of the claims to invoke 35 U.S.C. §112(f) as it exists on the date of filing hereof unless the words "means for" or "step for" are explicitly used in the particular claim.

What is claimed is:

1. An apparatus comprising:
   a memory configured to store:
   a plurality of steps performed during a test;
   a configuration for a first test environment in which the test was performed;
   a result of the test; and
   a test plan comprising:
   a plurality of planned steps to be performed during the test; and
   a configuration for a second test environment; and
   a processor communicatively coupled to the memory, the processor configured to:
   compare the plurality of steps performed during the test to the plurality of planned steps to determine that a step of the plurality of planned steps was not performed during the test;
   present, on a display, a first chart that indicates each step of the plurality of planned steps and that the determined step of the plurality of planned steps was not performed during the test;
   compare the configuration for the first test environment and the configuration for the second test environment to determine whether the first test environment was configured according to the configuration for the second test environment;
   present, on the display, a second chart that indicates whether the first test environment was configured according to the configuration for the second test environment;
   determine, based on the result of the test, that the test resulted in a failure;
   present, on the display, a third chart that indicates the failure; and
   deploy an application corresponding to the test plan if each step of the plurality of planned steps was performed during the test, if the first test environment was configured according to the configuration for the second test environment, and if the failure was fixed.

2. The apparatus of claim 1, wherein the configuration for the second test environment specifies at least one of an operating system, a patch level, and a hardware specification.

3. The apparatus of claim 1, wherein the processor is further configured to present, on the display, a fourth chart that indicates:
   a plurality of tests; and
   whether each test of the plurality of tests corresponds to an existing test plan.

4. The apparatus of claim 1, wherein:
   the memory is further configured to store a step that is not included in the test plan; and
   the processor is further configured to:
   determine whether the step that is not included in the test plan should be included in the test plan; and
   present, on the display, a fourth chart that indicates the step that is not included in the test plan if the step that is not included in the test plan should be included in the test plan.

5. The apparatus of claim 1, wherein:
   the test verifies whether the application is compliant; and
   the application is deployed in response to a determination that the each step of the plurality of planned steps was performed during the test and that the first test environment was configured according to the configuration for the second test environment.

6. The apparatus of claim 1, wherein the processor is further configured to determine whether the failure has been repaired.

7. The apparatus of claim 1, wherein one or more of the first chart, the second chart, and the third chart further identifies a tester who performed the test.

8. A method comprising:
   storing, by a memory, a plurality of steps performed during a test;
   storing, by the memory, a configuration for a first test environment in which the test was performed;
   storing, by the memory, a result of the test;
   storing, by the memory, a test plan comprising:
   a plurality of planned steps to be performed during the test; and
   a configuration for a second test environment;
   comparing, by a processor communicatively coupled to the memory, the plurality of steps performed during the test to the plurality of planned steps to determine that a step of the plurality of planned steps was not performed during the test;
   presenting, on a display, a first chart that indicates each step of the plurality of planned steps and that the determined step of the plurality of planned steps was not performed during the test;
   comparing, by the processor, the configuration for the first test environment and the configuration for the second test environment to determine whether the first test environment was configured according to the configuration for the second test environment;
   presenting, on the display, a second chart that indicates whether the first test environment was configured according to the configuration for the second test environment;
   determining, by the processor, based on the result of the test, that the test resulted in a failure;
   presenting, on the display, a third chart that indicates the failure; and
   deploying, by the processor, an application corresponding to the test plan if each step of the plurality of planned steps was performed during the test, if the first test environment was configured according to the configuration for the second test environment, and if the failure was fixed.

9. The method of claim 8, wherein the configuration for the second test environment specifies at least one of an operating method, a patch level, and a hardware specification.

10. The method of claim 8, further comprising presenting, on the display, a fourth chart that indicates:
    a plurality of tests; and
    whether each test of the plurality of tests corresponds to an existing test plan.

11. The method of claim 8, further comprising:
storing, by the memory, a step that is not included in the test plan;
determining, by the processor, whether the step that is not included in the test plan should be included in the test plan; and
presenting, on the display, a fourth chart that indicates the step that is not included in the test plan if the step that is not included in the test plan should be included in the test plan.

12. The method of claim 8, wherein:
the test verifies whether the application is compliant; and
the application is deployed in response to a determination that the each step of the plurality of planned steps was performed during the test and that the first test environment was configured according to the configuration for the second test environment.

13. The method of claim 8, further comprising determining, by the processor, whether the failure has been repaired.

14. The method of claim 8, wherein one or more of the first chart, the second chart, and the third chart further identifies a tester who performed the test.

15. A system comprising:
a compliance management server comprising a memory configured to:
store a plurality of steps performed during a test;
store a configuration for a first test environment in which the test was performed;
store a result of the test; and
store a test plan comprising:
a plurality of planned steps to be performed during the test; and
a configuration for a second test environment; and
a compliance management device communicatively coupled to the compliance management server, the compliance management device comprising a processor configured to:
compare the plurality of steps performed during the test to the plurality of planned steps to determine that a step of the plurality of planned steps was not performed during the test;
present, on a display, a first chart that indicates each step of the plurality of planned steps and that the determined step of the plurality of planned steps was not performed during the test;
compare the configuration for the first test environment and the configuration for the second test environment to determine whether the first test environment was configured according to the configuration for the second test environment;
present, on the display, a second chart that indicates whether the first test environment was configured according to the configuration for the second test environment;
determine, based on the result of the test, that the test resulted in a failure;
present, on the display, a third chart that indicates the failure; and
deploy an application corresponding to the test plan if each step of the plurality of planned steps was performed during the test, if the first test environment was configured according to the configuration for the second test environment, and if the failure was fixed.

16. The system of claim 15, wherein the configuration for the second test environment specifies at least one of an operating system, a patch level, and a hardware specification.

17. The system of claim 15, wherein the compliance management device is further configured to present, on the display, a fourth chart that indicates:
a plurality of tests; and
whether each test of the plurality of tests corresponds to an existing test plan.

18. The system of claim 15, wherein:
the compliance management server is further configured to store a step that is not included in the test plan; and
the compliance management device is further configured to:
determine whether the step that is not included in the test plan should be included in the test plan; and
present, on the display, a fourth chart that indicates the step that is not included in the test plan if the step that is not included in the test plan should be included in the test plan.

19. The system of claim 15, wherein:
the test verifies whether the application is compliant; and
the application is deployed in response to a determination that the each step of the plurality of planned steps was performed during the test and that the first test environment was configured according to the configuration for the second test environment.

20. The system of claim 15, wherein the compliance management device is further configured to determine whether the failure has been repaired.

21. The system of claim 15, wherein one or more of the first chart, the second chart, and the third chart further identifies a tester who performed the test.

* * * * *